United States Patent
Italiane et al.

(10) Patent No.: US 6,536,177 B1
(45) Date of Patent: Mar. 25, 2003

(54) COMPOSITION OF A WEATHERPROOF ROOFING MATERIAL

(76) Inventors: Frank Lane Italiane, 6505 Esplanade #3, Playa del Rey, CA (US) 90293; Joseph Sciarra, III, 1918 Santiago Dr., Newport Beach, CA (US) 92660

( * ) Notice: Subject to any disclaimer, the term of this patent is extended or adjusted under 35 U.S.C. 154(b) by 0 days.

(21) Appl. No.: 09/536,277

(22) Filed: Mar. 27, 2000

(51) Int. Cl.[7] .................................. E04D 3/35
(52) U.S. Cl. ..................... 52/518; 52/745.19; 428/517; 428/518; 428/520; 428/521; 264/173.16; 264/173.19; 156/60; 156/61
(58) Field of Search ................... 428/517, 518, 428/520, 521; 264/173.16, 173.19; 156/60, 61; 52/518, 745.19

(56) References Cited

U.S. PATENT DOCUMENTS

| | | | | |
|---|---|---|---|---|
| 5,306,548 A | * | 4/1994 | Zabrocki et al. | 428/215 |
| 5,334,450 A | * | 8/1994 | Zabrocki et al. | 428/332 |
| 5,992,116 A | * | 11/1999 | Ternes | 52/518 |
| 6,114,425 A | * | 9/2000 | Day et al. | 524/288 |

* cited by examiner

*Primary Examiner*—D. Lawrence Tarazano
(74) *Attorney, Agent, or Firm*—Norton R. Townsley; Belasco Jacobs & Townsley, LLP

(57) ABSTRACT

A novel composition of a materials that can be extruded into sheets to form panels to create a roofing system wherein the panels are formed to interlock with like panels in order to provide a substantially weatherproof covering on a roof. The sheet member has a top layer made of ASA (Acrylonitrile/Styrene/Acrylate polymer) and a bottom layer made of PVC (Polyvinylchloride). The two layers are extruded and bonded or preferably coextruded. Then the bonded materials are thermoformed to resemble more popular types of roof coverings such as shake or shingles or tiles.

12 Claims, No Drawings

COMPOSITION OF A WEATHERPROOF ROOFING MATERIAL

BACKGROUND OF THE INVENTION

I. Field of the Invention

This invention pertains to roofing materials. More specifically, the invention concerns a novel composition of a roofing material sheet.

II. Description of the Prior Art

Many types of roofing materials are available, and some of the more popular types include shake, shingles and tiles. Tiles are quite durable; however, their disadvantage is that they require a substantial amount of labor in their installation and can break on impact. Tiles tend to be excessively heavy and dangerous in earthquakes and high winds, and will fall through in the event of a fire. Because they are so heavy, tiles are also expensive to ship. Wood shakes and shingles are subject to breakage, rot and loss of coloration. Their cost is high and they are labor intensive to install. Furthermore, wood shakes and shingles can be relatively heavy, are flammable, porous, and cannot withstand relatively high wind velocity.

The inherent disadvantages of tiles and shakes have led to the development of alternative roofing materials such as plastic. Several different types of plastics are known in the art. However, many of the plastics have disadvantages, which typically may include poor insulating ability, poor ability to withstand the ultra violet (UV) radiation from the sun, and poor ability to withstand shock from an impact (such as from people walking on the roof or hail). Plastics tend also to be brittle and break with age.

Several prior art patents in the field of alternative roofing system include U.S. Pat. No. 5,525,413 issued to Daurer, et. al. entitled Industrial roofing fabric, U.S. Pat. No. 4,507,347 issued to Lupton, et. al. entitled Laminate and U.S. Pat. No. 4,307,552 issued to Votte entitled Synthetic roofing elements of the slate type and method of manufacturing same. However, none of the prior art teaches material having the features and structural composition as will be taught in the present invention.

The composition of the roofing material is highly important in order to maximize protection from the elements and chemical pollution. Chemical pollution results from chemicals contained in smog and other air pollution. These chemicals contribute to color loss, brittleness and other factors that decrease the durability of many types of roofing material.

Thus, it is a primary objective of the present invention to provide a composition of a roofing material that provides ultraviolet protection, flame and fire retardancy, insulation, weatherability, longevity and durability. Another objective of the present invention is to provide a composition of a roofing material that is lightweight and relatively inexpensive and provides maximum protection from the weather and chemical pollution.

SUMMARY OF THE INVENTION

The present invention is a novel composition of materials that can be extruded into sheets to form panels to create a roofing system wherein the panels are formed to interlock with like panels in order to provide a substantially weatherproof covering on a roof. The roofing panel has a sheet member made of a novel composition of matter. The sheet member has a top layer made of ASA (Acrylonitrile/Styrene/Acrylate polymer) and a bottom layer made of formulated PVC (Polyvinylchloride). The two layers are extruded and bonded by pressure or lamination or preferably coextruded. Then the bonded materials are thermoformed to resemble more popular types of roof coverings such as shakes, shingles or tiles.

The bottom layer is made of a proprietary formula of PVC. The present invention uses a specialized ASA with the present invention's proprietary formulation of PVC that is needed to meet roofing material performance such as impact and fire resistance.

The ASA used in the invention has been researched and tested to meet the requirements of the invention. Specifically, the specialized formulation of this ASA works in concert with the proprietary PVC compound that can be extruded and bonded or coextruded. This ASA has special characteristics that include tensile strength, elongation at break, modulus of elasticity in tension, impact strength, vicat softening temperature and density and is an impact modified, weatherable, copolymer with high thermal stability, good chemical resistance, and resistance to weathering, aging, and yellowing.

This ASA has high resistance to weathering because the elastomer component consists of an acrylate having a significantly higher resistance to UV radiation and attack by atmospheric oxygen than the butadiene rubber which is used, for example, in impact-modified polystyrene and ABS.

DESCRIPTION OF A PREFERRED EMBODIMENT

The panel comprises a sheet member having a top layer and a bottom layer. The top layer is made of ASA (Acrylonitrile/Styrene/Acrylate polymer) and the bottom layer is made of formulated PVC (Polyvinylchloride). The two layers are extruded and bonded or preferably coextruded.

The sheet member has a top surface exposed to the elements and a bottom surface that faces the surface of the roof when the panel is placed on the roof.

The bottom layer is made of a proprietary formula of PVC. The present invention uses a specialized ASA with the present invention's proprietary formulation of PVC that is needed to meet roofing material performance such as impact and fire resistance.

This ASA has a needed specialized compound that works in concert with the proprietary PVC compound that can be extruded and bonded or coextruded. The ASA is an impact modified weatherable, copolymer with resistance to weathering, aging, and yellowing, such as Luran® S 776 or 797 S/SE UV from BASF Corporation at 3000 Continental Drive-North, Mount Olive, N.J. 07828.

This ASA has special characteristics that include typical tensile strength of 40 MPa, typical elongation at break of 25%, typical modulus of elasticity in tension of 2,000 MPa, typical Izod notched impact strength of 60 kJ/m$^2$, typical Vicat softening temperature of 92° F. and typical density of 1.07 g/cm$^3$.

Further, the ASA used in this invention as described herein has specific additives that other ASA materials may not have. These additives are for resistance to UV, weathering, heat aging, high mechanical strength, impact resistance and corrosion resistance.

PVC has thousands of formulations with the common characteristic being the PVC resin base. Depending upon application, many other chemicals are added to the PVC resin base. Thus, resin is referred herein as a raw, unfinished material. In the present invention resin creates the base ingredient and other unique ingredients are added to form a novel compound. These other ingredients, generally called additives, assist in the molding of the invention, and add important properties to the finished product. These additives include impact modifiers, lubricants, heat stabilizers, pigments, flame retardant, plasticizers, and processing aids. The present invention uses a proprietary formulation of PVC that is needed to meet roofing material performance such as impact and fire resistance. The PVC is specially formulated with flame retardant to provide a substantially flame retardant and flame extinguishing material for the top layer of flammable ASA.

This present invention has created a unique polymer chain to create a PVC with certain desirable properties to bond with the ASA and have resistance to heat, toughness, and flexibility.

The present invention uses epoxidized soybean oil, plasticizers and heat stabilizers to prevent degradation caused by the heat of processing. Pigments are added to the present invention so that the finished product will be colored throughout. Flame retardant is added to provide a substantially flame retardant product. Flame extinguishing material is added to the PVC resin base specifically for the top layer of the flammable ASA. Processing aids and lubricants are used to assist in production and to improve the flow of resin in processing.

The unique and specific formula of PVC is compounded to interact with the specialized ASA to bond and be flame retardant. Most important is the ability of the present invention's novel compound of said PVC and ASA to meet the building codes such as Underwriters Laboratories Inc. or ICBO Evaluation Service, Inc. The specific compound of the PVC compound is listed below with its specific chemical brand:

| | |
|---|---|
| 1. PVC Resin - Oxy185 Oxychem Co. | |
| Occidental Chemical Corp. | PH: 800-578-8880 |
| 5005 LBJ Freeway | FX: 972-404-3669 |
| Dallas, TX 75244 | http://www.oxychem.com |
| 2. Heat Stabilizer - Mark 1900 | |
| Witco Corp. | PH: 800-494-8287 |
| One America Ln. | FX: 203-552-2850 |
| Greenwich, CT 06831 | http://www.witco.com |
| 3. Impact modifier - KM 334 | |
| Rohm and Haas Co. | PH: 800-356-2402 |
| 100 Independence Mall W. | FX: 215-592-2321 |
| Philadelphia, PA 19106 | http://www.rohmhaas.com |
| 4. Processing aide - K120MD | Same as above |
| 5. Processing aide - K175 | Same as above |
| 6. Epoxidized Soyabean Oil | |
| C.P. Hall Co. | PH: 800-449-4747 |
| 311 S. Wacker Dr. | FX: 312-554-7499 |
| Chicago, IL 60606 | http://www.cphall.com |
| 7. Lubricant - Loxiol HOB 7111 | |
| Henkel Corp. | PH: 800-922-0605 |
| 300 Brookside Ave. | FX: 215-628-1200 |
| Ambler, PA 19002 | |
| 8. Lubricant - Loxiol G670 | Same as above |
| 9. Lubricant - AC 316A | |
| Allied Signal Inc. | PH: 800-322-2766 |
| 101 Colombia Rd. | FX: 973-455-5000 |
| Morristown, NJ 07962 | http://www.alliedsignal.com |
| 10. Lubricant - WAX E | |
| Clariant Corp. | PH: 800-334-2823 |
| 4000 Monroe Rd. | FX: 704-377-1064 |
| Charlotte, NC 28205 | http://www.clariant.com |
| 11. Pigments - HX 52P | Currently unavailable |
| 12. Pigments - R 101 (T102) | |
| Dupont Co. | PH: 800-441-9485 |

-continued

| | |
|---|---|
| Titanium Dioxide | FX: 302-992-5273 |
| P.O. Box 80036 | http://www.dupont.com |
| Wilmington, DE 19880 | |
| 13. Flame Retardant - Envirostrand | |
| Anzon Inc. | PH: 800-523-0882 |
| 2545 Aramingo Ave | FX: 215-427-6955 |
| Philadelphia, PA 19125 | http://www.anzon.com |
| 14. Flame Retardant - Flame Tards | |
| Alcan Chemicals | PH: 800-321-3864 |
| 3690 Orange Place, Ste.400 | FX: 215-765-2550 |
| Cleveland, OH 44122 | |

The sheet member is formed into panels that have a raised central portion and substantially flat lips extending from the edges. Thus, when the panel is placed on the roof, the edges and lips lay substantially flat on the roof to define a chamber between the panel and the roof. The raised central portion does not contact the roof and is formed and designed to simulate the appearance of at least one predetermined type of roofing material including but not limited to tile, slate, and wood shake or shingle.

When placed on a roof, the chamber defined by the panel and the roof traps a pocket of air that along with the PVC bottom layer provides good insulation. Also, when placed on a roof, the bottom layer faces the roof, and the top layer is exposed to the weather. The composition of the top layer and bottom layer and the unique combination of the two layers offer optimal benefits. The top layer, being made of ASA, has been found to be highly resistant and durable against water as well as the wearing effects of the UV rays of the sun. And the bottom layer, being made of a specialized PVC compound, offers good insulation and has been found to be highly resistant to shock and fire. The bottom layer is also protected from the UV rays by the top layer.

EXAMPLE

A roofing panel was fabricated in accordance with the above description. The layer of ASA was 15 mil thick and the layer of PVC was 75 mil thick before thermoforming. Based on the current design of the panel it is estimated that the desirable thickness of the product should be 0.075". Of this the ASA layer is 0.008" thick and the PVC layer is 0.067" thick.

Size: Panels should be approx. 1'×4' single row or 2'×4' double row with an interlocking system. It is the panel design, installation, and the weight factor that significantly cuts down labor costs.

Weight: 58 pounds approximately per square (100 square feet). This product is the lightest weight roofing material on the market.

The panel was tested and the following results were obtained.

| Test Description | Test Method | Result |
|---|---|---|
| 2000 hours Weatherometer Test | ASTM G-23 | Passed. No cracking, crazing, flaking or any other visible effect on material. |
| Burn Rate | ASTM D-635 and UBC Code Standard No. 26-7 | As received 1.2 inch/min. After 2000 hours |

-continued

| Test Description | Test Method | Result |
|---|---|---|
| | | accelerated weathering 0.82 inch/min. |
| Self Ignition | ASTM D-1929, Method A and UBC Code Standard No. 26-6 | As received 733° F. After weathering 780° F. |
| Tensile Properties | | As received Tensile Strength 6614 psi Percent Elongation 15 After 2000 hours carbon arc exposure in Weatherometer Tensile Strength 7109 psi Percent Elongation 14 |
| Temperature Cycling | AC 07 | Failed requirement at 9 cycles |
| Class A Flame Spread | UL 790 | 2 Pass 3 Fail |

It is important to note that in the class A flame spread test there where 3 failures because of mechanical malfunctions and not because of material failure.

While a preferred embodiment of the invention has been described and illustrated for purposes of clarity and example, it should be understood that many changes, substitutions and modifications to the described embodiment will be apparent to those having skill in the art in light of the foregoing disclosure without departing from the scope and spirit of the present invention which is defined by the claims which follow.

What is claimed is:

1. A roofing panel in combination with a roof comprising:
   a top layer made of ASA material, and
   a bottom layer made of Polyvinylchloride material,
   said top and bottom layers bonded together.

2. A roofing panel in combination with a roof as claimed in claim 1 in which said ASA material includes additives which impart stability against UV light, thermal aging resistance, resistance to impact, resistance to weathering and dimensional stability.

3. A roofing panel in combination with a roof as claimed in claim 1 in which said Polyvinylchloride material is formulated with a flame retardant to impart flame retardancy and flame extinguishment properties for said top layer.

4. A method of fabricating a roofing panel in combination with a roof comprising the steps of:
   a. obtaining ASA material formulated for use in roofing materials;
   b. obtaining PVC material formulated for used in roofing materials; and
   c. coextruding said ASA and PVC material into a sheet having a layer of said ASA and a layer of said PVC.

5. A method of fabricating a roofing panel in combination with a roof comprising the steps of:
   a. obtaining ASA material formulated for use in roofing materials;
   b. obtaining PVC material formulated for used in roofing materials;
   c. fabricating said ASA material into sheet form;
   d. fabricating said PVC material into sheet form; and
   e. bonding said sheet of ASA to said sheet of PVC to form a laminate.

6. A method as claimed in claim 4 further comprising the step of forming said sheet into a panel having a raised central portion and a flat lip.

7. A method as claimed in claim 5 further comprising the step of forming said laminate into a panel having a raised central portion and a flat lip.

8. A roofing panel in combination with a roof comprising:
   a top layer made of ASA material; said ASA material including additives which impart stability against UV light, thermal aging resistance, resistance to impact, resistance to weathering and dimensional stability; and
   a bottom layer made of Polyvinylchloride material; said Polyvinylchloride material being formulated with a flame retardant to impart flame retardancy and flame extinguishment properties for said panel;
   said top and bottom layers bonded together.

9. A roofing panel in combination with a roof consisting essentially of:
   a top layer made of ASA material, and
   a bottom layer made of Polyvinylchloride material,
   said top and bottom layers bonded together.

10. A roofing panel in combination with a roof as claimed in claim 9 in which said ASA material includes additives which impart stability against UV light, thermal aging resistance, resistance to impact, resistance to weathering and dimensional stability.

11. A roofing panel in combination with a roof as claimed in claim 9 in which said Polyvinylchloride material is formulated with a flame retardant to impart flame retardancy and flame extinguishment properties for said top layer.

12. A roofing panel in combination with a roof consisting essentially of:
   a top layer made of ASA material; said ASA material including additives which impart stability against UV light, thermal aging resistance, resistance to impact, resistance to weathering and dimensional stability; and
   a bottom layer made of Polyvinylchloride material; said Polyvinylchloride material being formulated with a flame retardant to impart flame retardancy and flame extinguishment properties for said panel;
   said top and bottom layers bonded together.

* * * * *